United States Patent
Argillier et al.

(10) Patent No.: US 6,172,010 B1
(45) Date of Patent: Jan. 9, 2001

(54) WATER-BASED FOAMING COMPOSITION-METHOD FOR MAKING SAME

(75) Inventors: Jean-François Argillier, Suresnes; Annie Audibert-Hayet, Croissy sur Seine; Sabine Zeilinger, Saint Germain en Laye, all of (FR)

(73) Assignee: Institut Francais du Petrole, Rueil (FR)

( * ) Notice: Under 35 U.S.C. 154(b), the term of this patent shall be extended for 0 days.

(21) Appl. No.: 09/125,457

(22) PCT Filed: Dec. 3, 1997

(86) PCT No.: PCT/FR97/02186

§ 371 Date: Sep. 22, 1998

§ 102(e) Date: Sep. 22, 1998

(87) PCT Pub. No.: WO98/26864

PCT Pub. Date: Jun. 25, 1998

(30) Foreign Application Priority Data

Dec. 19, 1996 (FR) .................................. 96 15822

(51) Int. Cl.[7] ................. C09K 7/08; B01F 3/04
(52) U.S. Cl. ............ 507/102; 507/202; 507/112; 507/113; 507/120; 507/121; 507/129; 507/135; 507/222; 507/226; 516/10; 516/12; 516/15
(58) Field of Search ..................... 507/102, 202, 507/120, 121, 135, 129, 222, 226, 110, 111, 112, 113; 516/10, 12, 15

(56) References Cited

U.S. PATENT DOCUMENTS

| | | | | |
|---|---|---|---|---|
| 4,532,052 | * | 7/1985 | Weaver et al. | 507/102 |
| 5,129,457 | | 7/1992 | Sydansk | 166/274 |
| 5,495,891 | * | 3/1996 | Sydansk | 507/102 |
| 5,529,122 | * | 6/1996 | Thach | 507/202 |
| 5,607,902 | * | 3/1997 | Smith et al. | 507/120 |
| 5,716,910 | * | 2/1998 | Totten et al. | 507/102 |
| 5,776,871 | * | 7/1998 | Cothran et al. | 510/122 |
| 5,785,979 | * | 7/1998 | Wells | 510/156 |
| 5,851,960 | * | 12/1998 | Totten et al. | 507/102 |
| 5,945,387 | * | 8/1999 | Chatterji et al. | 507/202 |
| 5,957,203 | * | 9/1999 | Hutchins et al. | 166/309 |

FOREIGN PATENT DOCUMENTS 0 524 434   1/1993   (EP) .

* cited by examiner

Primary Examiner—Philip Tucker
(74) Attorney, Agent, or Firm—Millen, White, Zelano & Branigan

(57) ABSTRACT

The invention concerns a water based foaming composition and the method of making it. The composition is optimized in that it contains a surfactant specifically selected according to the polymer also present in the composition. The surfactant and the polymer are selected so that they are oppositely charged. The invention is very useful in drilling or treating wells.

14 Claims, No Drawings

WATER-BASED FOAMING COMPOSITION-METHOD FOR MAKING SAME

This invention relates to an aqueous foam composition that consists of an optimized combination of surfactants and polymers that are water-soluble. The applications of such a foam according to this invention vary widely, for example for body care, farming applications, fire-fighting, underground works, such as soil consolidation and operations in wells that are drilled into the subsoil: drilling, treatment of reservoirs, production of hydrocarbons.

The use of an aqueous foam to replace a well fluid that circulates through a pipe lining that goes down into a well which is drilled into the ground is known. In some cases, the density of the aqueous fluid that is used is too high for the type of rock, creating an excessive hydrostatic pressure compared to the fracturing resistance of the rock zones through which the drilling passes. The choice is then made to use aqueous fluids with densities that are reduced by the introduction of gas, and it is attempted to make the thus lightened fluid homogeneous by creating the most stable foam possible so that it will have at least adequate power for cleaning the cuttings.

Document US-5513712 describes a drilling process in which a foam that comprises a polymer such as non-cross-linked acrylamide and a surfactant is used, but it does not describe a foaming composition that is stable and optimized by achieving synergy between a specific polymer and a specific surfactant.

Thus, this invention relates to a water-based foaming composition that comprises at least one surfactant and a polymer. The surfactant and the polymer comprise charges of opposite sign.

The applicant has demonstrated that, surprisingly, it was possible to control the production of a stable foam from a composition that is optimized in terms of surfactant concentration if a polymer or a copolymer with a charge that is opposite in sign to that of the charge of the surfactant is combined with said surfactant. A cationic polymer or copolymer is combined with an anionic surfactant; an anionic polymer or copolymer is combined with a cationic surfactant.

The surfactants that can conceivably be used in this invention include all the standard anionic surfactants, such as the anionic group, or:
carboxylates:
    soaps of alkaline metals, alkyl or alkyl ether carboxylates,
    N-acylamino acids,
    N-acylglutamates,
    N-acylpolypeptides,
sulfonates:
    alkylbenzenesulfonates,
    paraffin sulfonates,
    α-olefin sulfonates,
    petroleum sulfonates,
    lignosulfonates,
    sulfosuccinic derivatives,
    polynaphthylmethanesulfonates,
    alkyl taurides,
sulfates:
    alkyl sulfates,
    alkyl ether sulfates,
phosphates:
    monoalkyl phosphates,
    dialkyl phosphates
phosphonates.

As cationic surfactants, it is possible to cite:
alkylamine salts,
quaternary ammonium salts of which nitrogen:
    comprises a fatty chain, for example, alkyltrimethyl or trimethylammonium derivatives, alkyldimethyl benzylammonium derivatives,
    comprises two fatty chains,
    forms part of a heterocycle, for example, the derivatives of pyridinium, imidazolinium, quinolinium, piperidinium, morpholinium.

All the standard anionic polymers can be used according to this invention, for example:
synthetic polymers or copolymers that are derived from:
    anionic monomers that contain carboxylate or sulfonate or phosphate or phosphonate groups, such as the monomers acrylate, methacrylate, itaconate, 2-acrylamido-2-methyl-propane, sulfonate, 2-methacryloxy ethane sulfonate, 3-acrylamido-3-methyl butanoate, styrene sulfonate, styrene carboxylate, vinyl sulfonate, and maleic acid salts.
synthetic copolymers that are derived from:
    an anionic monomer, for example in those that are described above and a neutral monomer, for example, acrylamide, acrylic acid, vinyl pyrrolidone, ethylene oxide, propylene oxide, maleic anhydride, vinyl alcohol, hydroxyethylacrylate, . . .
natural polymers such as:
    cellulose derivatives that are modified negatively, such as CMC,
    polysaccharides such as xanthanum, alginate,
    starches that are modified negatively,
    galactomannanes that are modified negatively.

All the standard cationic polymers can be used according to this invention, for example:
synthetic polymers or copolymers that are derived from standard cationic monomers, i.e., of the following general formula:
    R1
    C══CH2
    R2 where R1 or R2 comprises at least one N atom,
    polyethylene imines,
    polyamide amines,
    polyamines,
synthetic copolymers that are derived from:
    cationic monomers and neutral monomers (described above),
natural polymers:
    starches that are modified positively, chitosans,
    galactomannanes that are modified positively,
    cellulose derivatives that are modified positively.

The surfactant can be cationic at a concentration that is less than about $5 \cdot 10^{-3}$ mol/l, and the polymer can be anionic.

The surfactant can be anionic at a concentration that is less than about $5 \cdot 10^{-3}$ mol/l, and the polymer can be cationic.

The anionic polymer can be a copolymer such as AM/AMPS, of which the level of the charged portion can be between 5 and 40%, and preferably between 10 and 25%. The surfactant can be of the DoTAB type.

The anionic polymer can be a natural polymer that is modified negatively, for example such as CMC.

The cationic polymer can be a copolymer such as AM/MAPTAC, of which the level of the charged portion can be between 5 and 40% and preferably between 10 and 25. The surfactant can be of the SDS type.

The invention also relates to a process for producing a foam from water, at least one surfactant, and at least one polymer. In the process, a surfactant and a polymer or a copolymer of opposite charge are combined, and the polymer concentration is determined to obtain a stable foam with as low a surfactant level as possible.

The polymer concentration can be determined based on the charge level of the polymer and the concentration of surfactant that is used. Considering the electrostatic nature of the interactions between polymer and surfactant, their respective concentrations can be a function of the ionic force of the medium.

The foaming solution can, like well fluid (drilling, completion and workover), also contain solids (cuttings, neutral colloids, . . . ) or other non-charged water-soluble polymers, anti-corrosion additives, . . . .

This invention will be better understood and its advantages will become clearer from reading the tests, by no means limiting, that are described below.

The tests are based mainly on comparing, for different foam compositions, the two following measurements:
 the foam volume VM that is formed from a given volume of foaming solution and defined stirring conditions, which makes it possible to characterize the foaming capacity of the solution,
 the drainage rate VD, which makes it possible to characterize the stability of the foam that is formed.

Viscosity was measured at the Newtonian level with a low-gradient viscosimeter.

Operating Procedure:

The foaming solution consists of, at least, a mixture of at least one surfactant with variable concentration, at least one water-soluble polymer also of variable concentration, and water. The pH is adjusted to about 9 for all the tests. The foam is obtained from 200 ml of foaming solution by stirring with a whip. The speed of rotation is set at 2000 rpm. As a general rule, the stirring time is about 2 minutes, which is sufficient to obtain a homogeneous foam, as well as a maximum volume.

To measure the drainage rate, which is characteristic of the stability of the foam, the foam that is obtained is poured into a graduated glass funnel, and the volume of drained solution is noted based on time. The drainage rate is defined from the empirical equation that describes the changes in the drainage curves (Bikerman j. j. 1973):

$$V=V_0(1-\exp(-kt))$$

V the drained volume (cm$^3$)

$V_0$ the volume of the initial
    solution (cm$^3$)

t time (minute)

From this equation, k, a flow constant, (min$^{-1}$) is determined.

Drainage rate VD is defined by $$VD=kV_0/2 \ (cm^3/min.)$$

The lower VD is, the more stable the foam.

Tested Systems:

1. Surfactants:
    Dodecyltrimethylammonium bromide (DoTAB): cationic surfactant that has the following general formula:

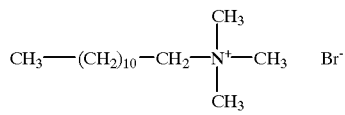

sodium dodecyl sulfate (SDS): anionic surfactant of general formula:

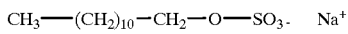

2. Polymers:
    Polyacrylamide AM (molecular weight MW about 2.5 10$^6$ g/mol).
    copolymer acrylamide/acrylamido methyl propane sulfonate AM/AMPS of general formula:

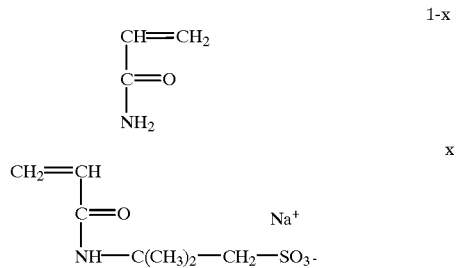

AM/AMPS 75/25 x=25% and Mw=2.8·10$^6$ g/mol
AM/AMPS 90/10 x=10% and Mw=3.2·10$^6$ g/mol
    carboxymethyl cellulose (CMC). The mean degree of substitution of the carboxylic groups by the cellulose cycle of the sample that is studied is close to 1. Its molecular weight is about MW=2.10$^6$ g/mol.
    copolymer acylamide/methyacrylamido propyltrimethylammonium chloride AM/MAPTAC of general formula:

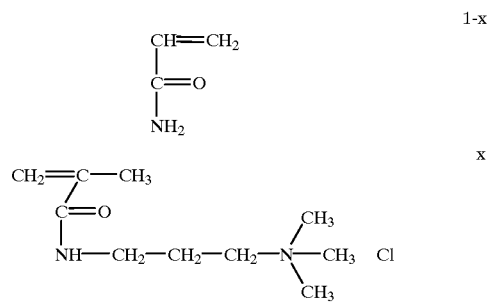

Copolymers AM/MAPTAC 75/25 (x=25) and AM/MAPTAC 90/10 (x=10%) have molecular weights Mw of about 3.10$^6$ g/mol.

| Test 1: Single Cationic surfactant (DoTAB) | | | | |
|---|---|---|---|---|
| DoTAB (mol/l) | Polymer (750 ppm) | VM (cm$^3$) | Viscosity (mPa · s) | VD (cm$^3$/min.) |
| 5.10$^{-5}$ | 0 | 0 | 0.88 | — |
| 5.10$^{-4}$ | 0 | 0 | 0.86 | — |

-continued

Test 1: Single Cationic surfactant (DoTAB)

| DoTAB (mol/l) | Polymer (750 ppm) | VM (cm³) | Viscosity (mPa · s) | VD (cm³/min.) |
|---|---|---|---|---|
| $5.10^{-3}$ | 0 | 1600 | 0.85 | 40 |
| $20.10^{-3}$ | 0 | 2200 | 0.83 | 23 |

These tests show that an adequate quantity of surfactant is needed in order for the production of a stable foam to take place. At a surfactant concentration of $5.10^{-3}$ (mol/l), the foam is formed while being stirred, but it is very unstable.

Test 2: Cationic Surfactant and Polyacrylamide AM (non-ionic)

| DoTAB (mol/l) | Polymer (750 ppm) | VM (cm³) | Viscosity (mPa · s) | VD (cm³/min.) |
|---|---|---|---|---|
| $5.10^{-5}$ | AM | 0 | 1.43 | — |
| $5.10^{-4}$ | AM | 0 | 1.40 | — |
| $5.10^{-3}$ | AM | 1000 | 1.34 | — |
| $20.10^{-3}$ | AM | 1800 | 1.33 | 17.2 |

At a DoTAB concentration of $5.10^{-3}$ (mol/l), the foam that is formed is destroyed after less than one minute.

This test shows that for DoTAB surfactant concentrations that are less than or equal to about $5.10^{-3}$ mol/l, it is impossible to form a stable foam even in the presence of a certain polymer concentration of the polyacrylamide type.

Starting at $20.10^{-3}$ mol/l and up of surfactant, the foam that is formed in the presence of the polyacrylamide-type polymer is more stable than without polymer. This is due mainly to the increase in viscosity of the foaming composition, as the measurements of viscosity confirm.

Test 3: Cationic Surfactant DoTAB and Sulfonated Polyacrylamide

| DoTAB (mol/l) | Polymer (750 ppm) | VM (cm³) | Viscosity (mPa · s) | VD (cm³/min.) |
|---|---|---|---|---|
| $5.10^{-5}$ | AM/AMPS-75/25 | 500 | — | — |
| $5.10^{-4}$ | AM/AMPS-75/25 | 600 | — | — |
| $5.10^{-3}$ | AM/AMPS-75/25 | <400 | — | — |
| $20.10^{-3}$ | AM/AMPS-75/25 | precipitated | — | — |
| $5.10^{-5}$ | AM/AMPS-90/10 | 500 | 3.09 | 5 |
| $5.10^{-4}$ | AM/AMPS-90/10 | 600 | 3.05 | 4.6 |
| $5.10^{-3}$ | AM/AMPS-90/10 | 1700 | 1.22 | 9 |
| $20.10^{-3}$ | AM/AMPS-90/10 | precipitated | — | — |

With a polymer such as AM/AMPS-75/25, i.e., one that comprises on the order of 25% of a charge with a sign opposite to that of the charge of the surfactant, the foam can form, with between-charge interactions, at concentrations of less than $5.10^{-3}$ mol/l of surfactant, and in particular at concentrations of $5.10^{-5}$ and $5.10^{-4}$ mol/l of surfactant. Starting at and beyond $5.10^{-3}$ mol/l of surfactant concentration, foam does not form because there is precipitation, very likely due to excessively strong interactions between the charged polymer and the surfactant. Such a test with a polymer such as AM/AMPS-75/25, however, shows the importance of having opposite charges between surfactant and polymer for forming a foaming composition.

With a less charged polymer, such as AM/AMPS-90/10 (level of charge 10%), it is noted that the foam is produced for concentrations that are less than $5.10^{-3}$ mol/l of surfactant, as for the polymer with a 25% charge, but for a surfactant concentration of about $5.10^{-3}$ mol/l, the foaming composition is greatly optimized since a large and very stable volume of foam is obtained, taking into account the low drainage rate that is measured.

Relative to the foam that is formed from a polyacrylamide polymer (test 2), the foam volume is comparable, but with a quantity of surfactant that is four times smaller and, moreover, with the achievement of greater stability.

Test 4: Cationic Surfactant DoTAB and Carboxymethylcellulose (AQUAPAC produced by the Aqualon Company)

| DoTAB (mol/l) | Polymer (750 ppm) | VM (cm³) | Viscosity (mPa · s) | VD (cm³/min.) |
|---|---|---|---|---|
| $5.10^{-5}$ | CMC | 450 | — | — |
| $5.10^{-4}$ | CMC | 600 | — | 2.4 |
| $5.10^{-3}$ | CMC | precipitated | — | — |
| $20.10^{-3}$ | CMC | precipitated | — | 22.3 |

This test shows that the addition of an anionic cellulose natural polymer such as carboxymethylcellulose (CMC) with a cationic surfactant (DoTAB) makes it possible to form foam because of between-charge interactions, with a surfactant concentration of less than $5.10^{-3}$ mol/l. The foam that is formed with a concentration of $5.10^{-4}$ mol/l of DoTAB and 750 ppm of CMC is very stable. It is verified that an excessive surfactant concentration hampers the formation of a foam, very likely due to the excessively strong interactions between the polymer and the surfactant.

Test 5: Cationic Surfactant DoTAB and Sulfonated Polyacrylamide Influence of the Presence of Salt. 0.5 g/l of NaCl is added to the solution.

| DoTAB (mol/l) | Polymer (750 ppm) | VM (cm³) | Viscosity (mPa · s) | VD (cm³/min.) |
|---|---|---|---|---|
| $5.10^{-5}$ | 0 | 0 | — | — |
| $5.10^{-4}$ | 0 | 0 | — | — |
| $5.10^{-3}$ | 0 | 1500 | — | 172 (*) |
| $20.10^{-3}$ | 0 | 2200 | — | 20 |
| $5.10^{-5}$ | AM/AMPS-90/10 | 450 | — | 8 |
| $5.10^{-4}$ | AM/AMPS-90/10 | 700 | — | 8 |
| $5.10^{-3}$ | AM/AMPS-90/10 | 1500 | — | 10 |
| $20.10^{-3}$ | AM/AMPS-90/10 | precipitated | — | — |

(*) The foam breaks almost instantaneously.

This test confirms that the DoTAB and AM/AMPS-90/10 foaming solution provides excellent results in terms of foam stability, even in the presence of salt.

Test 6: Cationic Surfactant DoTAB and Sulfonated Polyacrylamide Influence of the AM/AMPS-90/10 Copolymer Concentration.

| DoTAB (mol/l) | Polymer (ppm) | VM (cm³) | Viscosity (mPa · s) | VD (cm³/min.) |
|---|---|---|---|---|
| $5.10^{-5}$ | 100 | <150 | 7.3 | — |
| $5.10^{-4}$ | 100 | <130 | 2.5 | — |
| $5.10^{-3}$ | 100 | 1650 | 0.77 | 20.6 |
| $20.10^{-3}$ | 100 | precipitated | — | — |
| $5.10^{-5}$ | 750 | 500 | 3.09 | 5 |
| $5.10^{-4}$ | 750 | 700 | 3.05 | 4.6 |
| $5.10^{-3}$ | 750 | 1700 | 1.22 | 9 |
| $20.10^{-3}$ | 750 | precipitated | — | — |
| $5.10^{-5}$ | 1500 | 500 | 46 | 3 |

Test 6: Cationic Surfactant DoTAB and Sulfonated Polyacrylamide Influence of the AM/AMPS-90/10 Copolymer Concentration.

| DoTAB (mol/l) | Polymer (ppm) | VM (cm³) | Viscosity (mPa · s) | VD (cm³/min.) |
|---|---|---|---|---|
| $5.10^{-4}$ | 1500 | 700 | 33 | 3 |
| $5.10^{-3}$ | 1500 | precipitated | — | |
| $20.10^{-3}$ | 1500 | precipitated | — | |

These results show that even a small polymer concentration (100 ppm) is effective in stabilizing the foam. By increasing the polymer concentration (750 ppm to 1500 ppm), the foam that is formed is also more stable. Taking into account the strong interactions between polymer and surfactant, the surfactant concentration should be adapted to the polymer concentration that is used, or vice versa. In this example, it is possible to determine an optimum surfactant concentration of about $5 \cdot 10^{-3}$ mol/l and for a polymer concentration of between 100 and 1000 ppm.

This example clearly shows the synergy between the surfactant and the polymer and the way of optimizing the foaming solution.

Test 7: Single SDS Anionic Surfactant

| SDS (mol/l) | Polymer (750 ppm) | VM (cm³) | Viscosity (mPa · s) | VD (cm³/min.) |
|---|---|---|---|---|
| $5.10^{-5}$ | 0 | 0 | — | |
| $1.10^{-4}$ | 0 | 0 | 0.9 | |
| $5.10^{-4}$ | 0 | 500 | — | 22 |
| $1.10^{-3}$ | 0 | 1700 | 0.9 | 21 |
| $5.10^{-3}$ | 0 | 2000 | — | 13 |

This test shows that this solution cannot form foam with a low surfactant concentration and that at a higher concentration, the foam is less stable (VD on the order of 13 cm³/min). It is noted that the measurement that is obtained with this surfactant is a little more stable than that obtained with DoTAB (Test 1).

Test 8: Anionic Surfactant SDS and Cationic Polyacrylamide AM/MAPTAC 90/10

| SDS (mol/l) | Polymer (750 ppm) | VM (cm³) | Viscosity (mPa · s) | VD (cm³/min.) |
|---|---|---|---|---|
| $5.10^{-5}$ | AM/MAPTAC 90/10 | 500 | — | 2.6 |
| $5.10^{-4}$ | AM/MAPTAC 90/10 | 600 | — | 5.4 |
| $5.10^{-3}$ | AM/MAPTAC 90/10 | 2200 | — | 5.1 |

In this example of foaming composition that comprises an anionic surfactant and a cationic polymer, it is observed that the addition of cationic polymer is very beneficial to the formation and the stability of the foam that is formed, since a stable foam is formed even with only $5 \cdot 10^{-5}$ mol/l of SDS and that with $5.10^{-3}$ mol/l of SDS, 2200 cm³ of very stable foam (VD close to 5 cm³/min) is formed.

Test 9: Anionic Surfactant SDS and Cationic Polyacrylamide AM/MAPTAC-75/25.

| SDS (mol/l) | Polymer (750 ppm) | VM (cm³) | Viscosity (mPa · s) | VD (cm³/min.) |
|---|---|---|---|---|
| $5.10^{-5}$ | AM/MAPTAC-75/25 | 450 | — | 1.8 |
| $5.10^{-4}$ | AM/MAPTAC-75/25 | 500 | — | 2.1 |
| $5.10^{-3}$ | AM/MAPTAC-75/25 | precipitated | — | |

This test shows that with a more charged polymer, the combination of a cationic polymer and an anionic surfactant provides very stable foams at a low surfactant concentration. At a higher concentration (in this case greater than or equal to about $5.10^{-3}$ mol/l), it is noted that the interactions are very strong, which produces precipitation.

In general, it should be noted that adding simple electrolytes to the foaming composition makes it possible to partially screen the interactions of electrostatic origin. In this case, the surfactant concentrations can be higher without there being precipitation.

What is claimed is:

1. A water-based foaming composition that comprises at least one surfactant and a water-soluble polymer, characterized in that said surfactant has charges of a sign that is opposite to those of said polymer, said surfactant being present at a concentration of less than about $5 \cdot 10^{-3}$ mol/l and said polymer being present in a concentration sufficient to provide a stable foam.

2. A composition according to claim 1, wherein the surfactant is cationic and in which the polymer is anionic.

3. A composition according to claim 1, wherein the surfactant is anionic and wherein the polymer is cationic.

4. A composition according to claim 2, wherein the anionic polymer is an acrylamide/acrylamido methane sulfonate copolymer (AM/AMPS), whose level of the charged portion is between 5 and 40%, and wherein the surfactant is dodecyltrimethylammonium bromide (DoTAB).

5. A composition according to claim 2, wherein the anionic polymer is a natural polymer.

6. A composition according to claim 3, wherein the cationic polymer is AM/MAPTAC, whose level of the charged portion is between 5 and 40%, and wherein the surfactant is SDS.

7. A process for producing a foam from water, at least one surfactant and at least one polymer, wherein a surfactant present in a concentration of less than about $5 \cdot 10^{-3}$ mol/l and a water-soluble polymer of opposite charge are combined, and the polymer concentration is determined in order to obtain a stable foam with the lowest surfactant level possible.

8. Process according to claim 7, wherein the polymer concentration is determined based mainly on the charge level of the polymer and the surfactant concentration used.

9. In a well that is drilled into the ground, circulating a water-based foaming composition comprising an anionic surfactant and a cationic water-soluble polymer wherein the anionic surfactant is present in a concentration of less than about $5-10^{-3}$ mol/l.

10. A composition according to claim 4, wherein said level is between 10 and 25%.

11. A composition according to claim 5, wherein the natural polymer is a negatively modified cellulose derivative.

12. A composition according to claim 11, wherein the negatively modified cellulose derivative is CMC.

13. A composition according to claim 6, wherein said level is between 10 and 25%.

14. In a well that is drilled into the ground, circulating a foaming composition according to claim 12.

* * * * *